(12) United States Patent
Choi et al.

(10) Patent No.: US 6,939,019 B2
(45) Date of Patent: Sep. 6, 2005

(54) BACKLIGHT ASSEMBLY AND LIQUID CRYSTAL DISPLAY APPARATUS HAVING THE SAME

(75) Inventors: Jung-Min Choi, Suwon-si (KR); Hee-June Kwak, Yongin-si (KR); Sang-Duk Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/295,384

(22) Filed: Nov. 15, 2002

(65) Prior Publication Data

US 2003/0198038 A1 Oct. 23, 2003

(30) Foreign Application Priority Data

Apr. 19, 2002 (KR) ........................................ 2002-21613

(51) Int. Cl.[7] .............................................. F21V 7/04
(52) U.S. Cl. ........................... 362/31; 362/330; 362/27; 362/216
(58) Field of Search ............................ 362/31, 27, 330, 362/216; 315/307, 312, 194, 195

(56) References Cited

U.S. PATENT DOCUMENTS 5,564,818 A * 10/1996 Grossman et al. .......... 362/221
6,193,390 B1 * 2/2001 Sakakibara et al. ......... 362/216
6,231,202 B1 * 5/2001 Kozaka et al. ................ 362/31
6,255,782 B1 * 7/2001 Kuroda et al. ........... 315/169.1
6,377,000 B2 * 4/2002 Kim ........................... 315/307
6,609,807 B2 * 8/2003 Torihara et al. ............... 362/31

* cited by examiner

Primary Examiner—Thomas M. Sember
Assistant Examiner—Anabel Ton
(74) Attorney, Agent, or Firm—Cantor Colburn LLP

(57) ABSTRACT

A backlight assembly including a light guide plate having a plurality of side surfaces, a first lamp having a first lamp tube disposed adjacent to the plurality of side surfaces, first and second electrodes disposed at opposite end portions of the first lamp tube, a second lamp having a second lamp tube disposed adjacent to the plurality of side surfaces, third and fourth electrodes disposed at opposite end portions of the second lamp tube, the third and first electrodes being disposed adjacent to one another, and the fourth and second electrodes being disposed adjacent to one another, a connector for electrically connecting the first and third electrodes, and a power supply for supplying a first discharge voltage to the second electrode and a second discharge voltage to the fourth electrode, the first and second discharge voltages having a phase difference of 180° and a same voltage level.

21 Claims, 14 Drawing Sheets

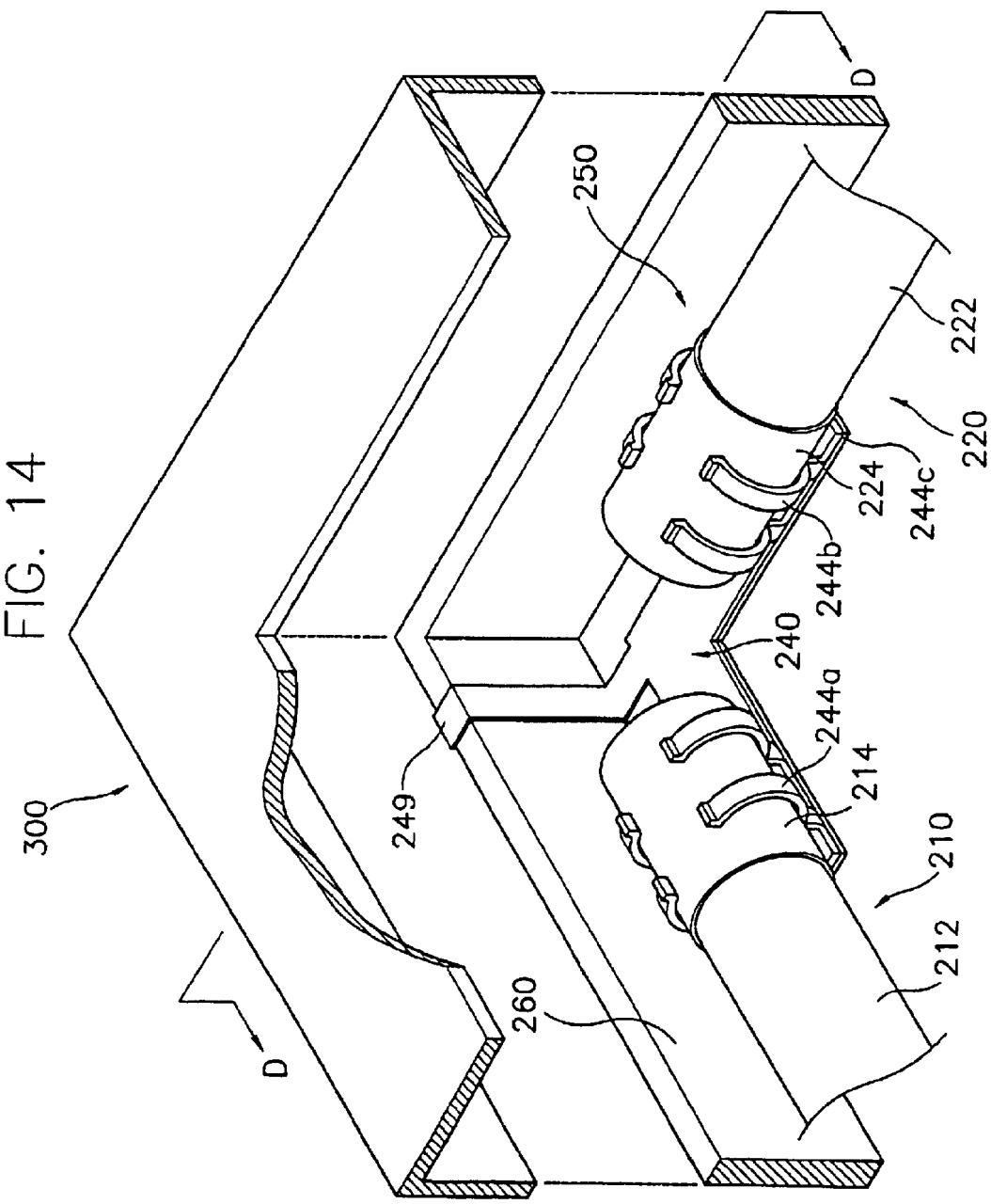

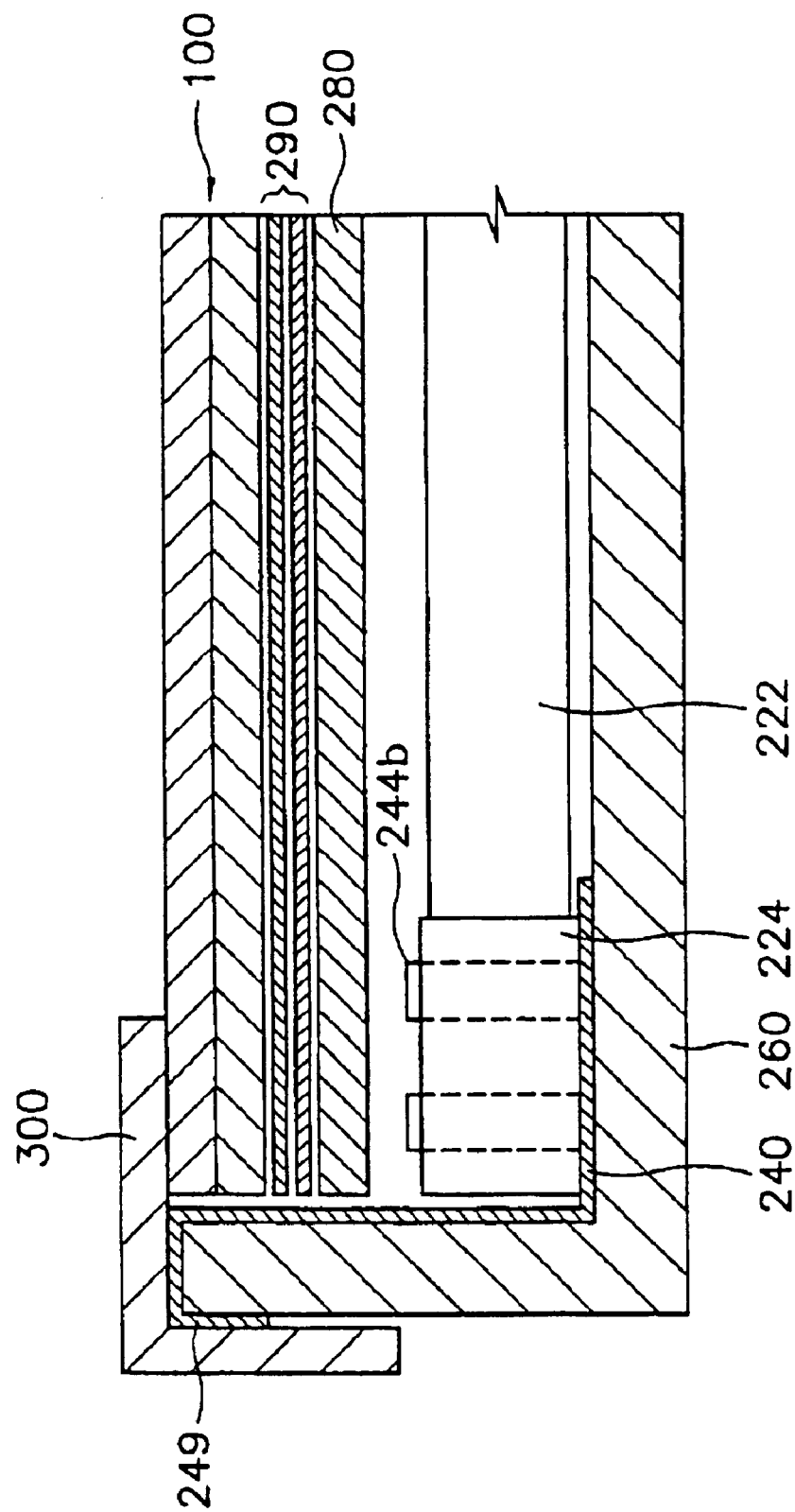

BACKLIGHT ASSEMBLY AND LIQUID CRYSTAL DISPLAY APPARATUS HAVING THE SAME

BACKGROUND OF THE INVENTION

1. Field of the Invention

The present invention relates to a backlight assembly and an LCD (Liquid Crystal Display) apparatus, and more particularly to a backlight assembly having a reduced size and an LCD apparatus having the same.

2. Description of the Related Art

In general, an LCD apparatus can be defined as a display apparatus that allows a user to recognize data processed in an information-processing unit as an image. In order to display the data as the image, the LCD apparatus uses a liquid crystal in which a light transmittance varies with an intensity of an applied electric field.

The LCD apparatus requires technologies capable of applying an electric field to a liquid crystal layer and supplying a light having a uniform brightness to the liquid crystal layer. The liquid crystal layer may be divided into a number of minute areas each having a different intensity of electrical field applied thereto. The technology for applying the electric field to the liquid crystal layer may be performed using a thin film transistor and a transparent conductive thin film.

The technology for supplying the light to the liquid crystal layer may be performed using a CCFL (Cold Cathode Fluorescent Lamp). This is because the CCFL has various advantages such as a high brightness, a white light, a low heat, a long life and so on. In the CCFL, an electron activates a fluorescent material by discharging secondary electrons caused by dissociating ions and photoelectrons caused by recombining the ions to generate the light.

FIG. 1 is a perspective view showing a conventional CCFL lamp.

Referring to FIG. 1, a CCFL 10 includes a lamp tube 5, a first electrode 8 and a second electrode 9. The lamp tube 5 includes a tube body 4, a fluorescent material layer 3 disposed on an inner wall of the tube body 4 and a discharge gas 2 injected into the tube body 4. First and second electrodes 8 and 9 are disposed in the tube body, facing each other.

The CCFL 10 receives a discharge voltage from an external source, which is sufficient to allow electrons to travel from the first electrode 8 to the second electrode 9 and thus generate a visual ray. To receive the discharge voltage, the first and second electrode 8 and 9 are connected to a first lamp wire 8a and a second lamp wire 9a using a welding process, respectively. The first and second lamp wires 8a and 9a are coupled to a lamp wire connector 7.

As a display size of the LCD apparatus increases, the amount of the light required by the LCD apparatus to properly display images rapidly increases. Accordingly, the LCD apparatus needs a CCFL having a length longer than that of the CCFL 10 shown in FIG. 1.

FIG. 2 is a perspective view showing another conventional lamp.

In FIG. 2, reference numerals "21" and "22" indicate first and second lamp tubes, respectively. The first and second lamp tubes are L-shaped and paired to form lamp 20. Reference numerals "21a", "21b", "22a" and "22b" indicate first to fourth lamp wires for supplying a power voltage to the first and second lamp tubes 21 and 22, and reference numerals "21c" and "21d" indicate lamp wire connectors for the first to fourth lamp wires 21a, 21b, 22a and 22b.

The CCFLs 10 and 20 shown in FIGS. 1 and 2 have a lot of disadvantages regarding the size of a corresponding LCD apparatus. Particularly, since the L-shaped CCFL 20 employs the first to fourth lamp wires 21a, 21b, 22a and 22b having a longer length than that of the CCFL 10 shown in FIG. 1, an entire size of the LCD apparatus that employs the L-shaped CCFL 20 is largely increased.

Hereinafter, the disadvantages regarding the size of the LCD apparatus that employs the L-shaped CCFL 20 will be described with reference to FIG. 3.

FIG. 3 is a partially cut perspective view showing an LCD apparatus having an L-shaped lamp.

Referring to FIG. 3, the LCD apparatus 30 includes a receiving container 31 for receiving the L-shaped CCFL 20 and a light guide plate 32 for receiving the light from the L-shaped CCFL 20. The receiving container 31 has a hexahedron shape that an upper surface is opened, so that the receiving container 31 has first side surface 31a, second side surface 31b, third side surface (not shown), fourth side surface (not shown), and a bottom surface 31c. The light guide plate 32 having a plate shape consisting of four side surfaces, an upper surface and a lower surface is disposed on the bottom surface 31c of the receiving container 31.

The first lamp tube 21 of the L-shaped CCFL 20 having the first and second lamp wires 21a and 21b is disposed between the second surface 31d of the receiving container 31 and the light guide plate 32. The second lamp tube 22 of the L-shape CCFL 20 having the third and fourth lamp wires 22a and 22b is disposed between the first surface 31a of the receiving container 31 and the light guide plate 32.

The receiving container 31 further includes a first barrier rib 31b and a second barrier rib 31e. The first barrier rib 31b is disposed between the second lamp tube 22 and the first side surface 31a of the receiving container 31 to provide a first receiving space for the third lamp wire 22a. The second barrier rib 31e is disposed between the first lamp tube 21 and the second side surface 31d of the receiving container 31 to provide a second receiving space for the first lamp wire 21a. The third lamp wire 22a connected to the second lamp tube 22 is received between the first side surface 31a and the first barrier rib 31b and the first lamp wire 21a connected to the first lamp tube 20 is received between the second side surface 31d and the second barrier rib 31e.

As aforementioned above, the LCD apparatus needs to form the first and second barrier ribs 31b and 31e on the receiving container 31 to fix the first and third lamp wires 21a and 22a to the receiving container 31. Thus, the size of the receiving container 31 increases by sizes of the first and second receiving spaces, thereby increasing the entire size of the LCD apparatus 30.

BRIEF SUMMARY OF THE INVENTION

The invention provides a backlight assembly having an entirely reduced size.

The invention also provides an LCD apparatus having an entirely reduced size.

In one embodiment of the invention, there is provided a backlight assembly comprising: a light guide plate having a plurality of side surfaces, for changing a direction and an optical property of a light provided from an external source; a first lamp having a first lamp tube disposed adjacent to two of the side surfaces, a first electrode disposed at a first end portion of the first lamp tube and a second electrode disposed at a second end portion opposite the first end portion of the first lamp tube; a second lamp having a second lamp tube disposed adjacent to a remaining two of the side surfaces, a third electrode disposed at a third end portion of the second lamp tube and a fourth electrode disposed at a fourth end portion, the third and fourth end portions being disposed adjacent to the first and second end portions, respectively; connecting means for electrically connecting the first electrode to the third electrode; and power supply means for supplying a first discharge voltage and a second discharge voltage to the second and fourth electrodes, respectively, the first and second discharge voltages having a phase difference of 180° from each other and a same voltage level.

In another embodiment, there is provided a backlight assembly comprising: a light guide plate having four surfaces of a plate shape, for changing a direction and an optical property of a light provided from an external source; a first lamp having a first lamp tube disposed adjacent to two of the four surfaces, a first electrode disposed on a surface of a first end portion of the first lamp tube and a second electrode disposed at an inside of a second end portion opposite the first end portion of the first lamp tube, the first lamp tube having an L shape; a second lamp having a second lamp tube disposed adjacent to a remaining two of the four surfaces, a third electrode disposed on a surface of a third end portion of the second lamp tube and a fourth electrode disposed at an inside of a fourth end portion of the second lamp tube, the third and fourth end portions being disposed adjacent to the first and second end portions, respectively and the second lamp tube having the L shape; a conductive lamp connecting member for electrically connecting the first electrode to the third electrode; and power supply means for supplying a first discharge voltage and a second discharge voltage to the second and fourth electrodes, respectively, the first and second discharge voltages having a phase difference of 180° from each other and a same voltage level.

In another embodiment aspect, there is provided an LCD apparatus comprising: a backlight assembly having a light guide plate having a plurality of side surfaces, for changing a direction and an optical property of a light provided from an external source; a first lamp having a first lamp tube disposed adjacent to two of the side surfaces, a first electrode disposed at a first end portion of the first lamp tube and a second electrode disposed at a second end portion opposite the first end portion of the first lamp tube; a second lamp having a second lamp tube disposed adjacent to a remaining two of the side surfaces, a third electrode disposed at a third end portion of the second lamp tube and a fourth electrode disposed at a fourth end portion, the third and fourth end portions being disposed adjacent to the first and second end portions, respectively; connecting means for electrically connecting the first electrode to the third electrode; and power supply means for supplying a first discharge voltage and a second discharge voltage to the second and fourth electrodes, respectively, the first and second discharge voltages having a phase difference of 180° from each other and a same voltage level; and an LCD panel assembly for receiving the light from the backlight assembly and generating a display light having image information.

According to the LCD apparatus, it is able to remove a lamp wire for supplying a power voltage to the lamp, so that an entire size of the LCD apparatus can be reduced and the lamp can be easily replaced.

BRIEF DESCRIPTION OF THE DRAWINGS

The above and other advantages of the present invention will become readily apparent by reference to the following detailed description when considered in conjunction with the accompanying drawings wherein:

FIG. 14 is a partially cut perspective view showing the backlight assembly, the lamp connecting member and a chassis according to the present invention; and FIG. 15 is a cross-sectional view taken along the line D—D showing a structure of the LCD apparatus shown in FIG. 13.

DETAILED DESCRIPTION OF THE PREFERRED EMBODIMENTS

Figure 1:
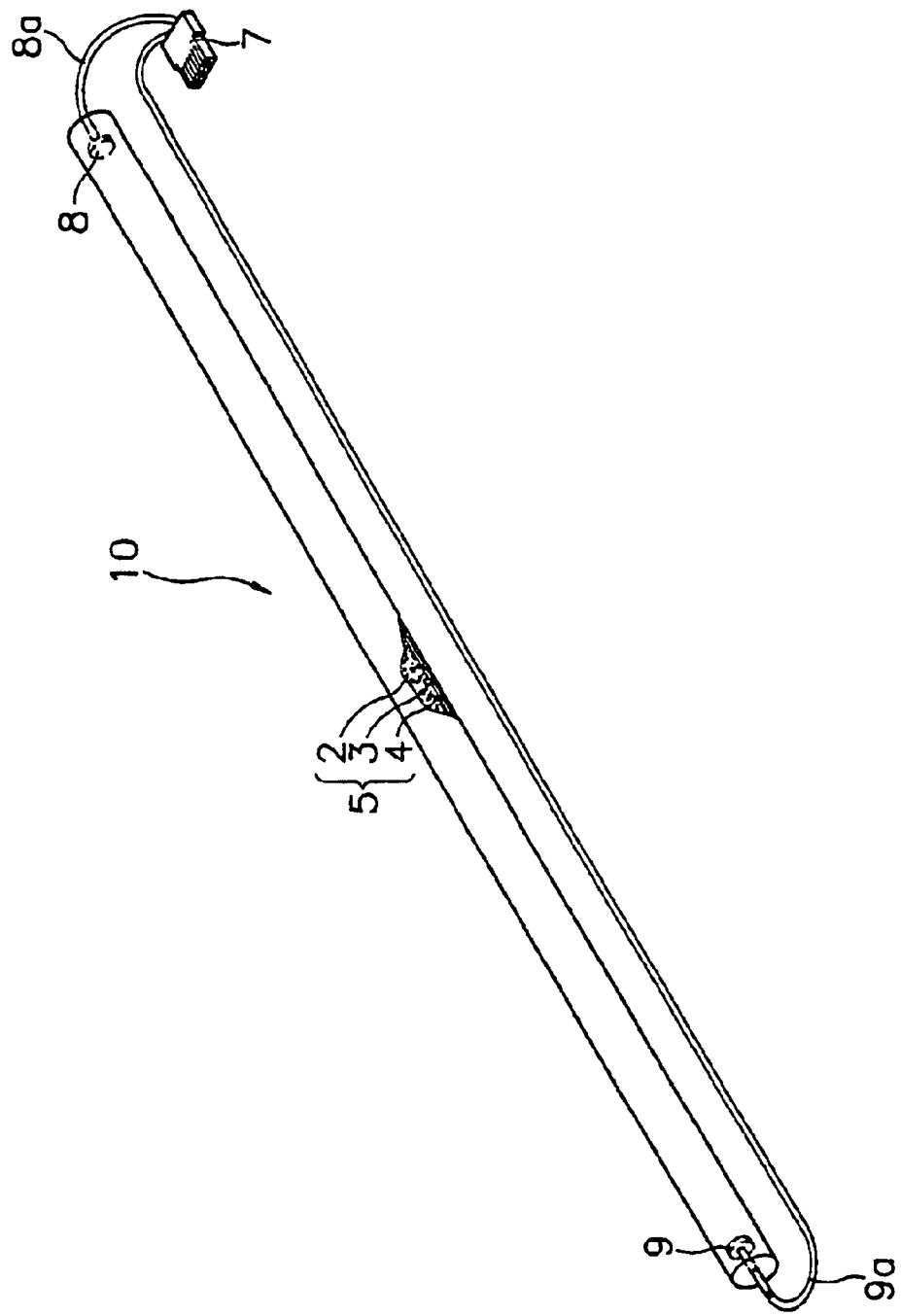
FIG. 1 is a perspective view showing a conventional CCFL.
Figure 2:
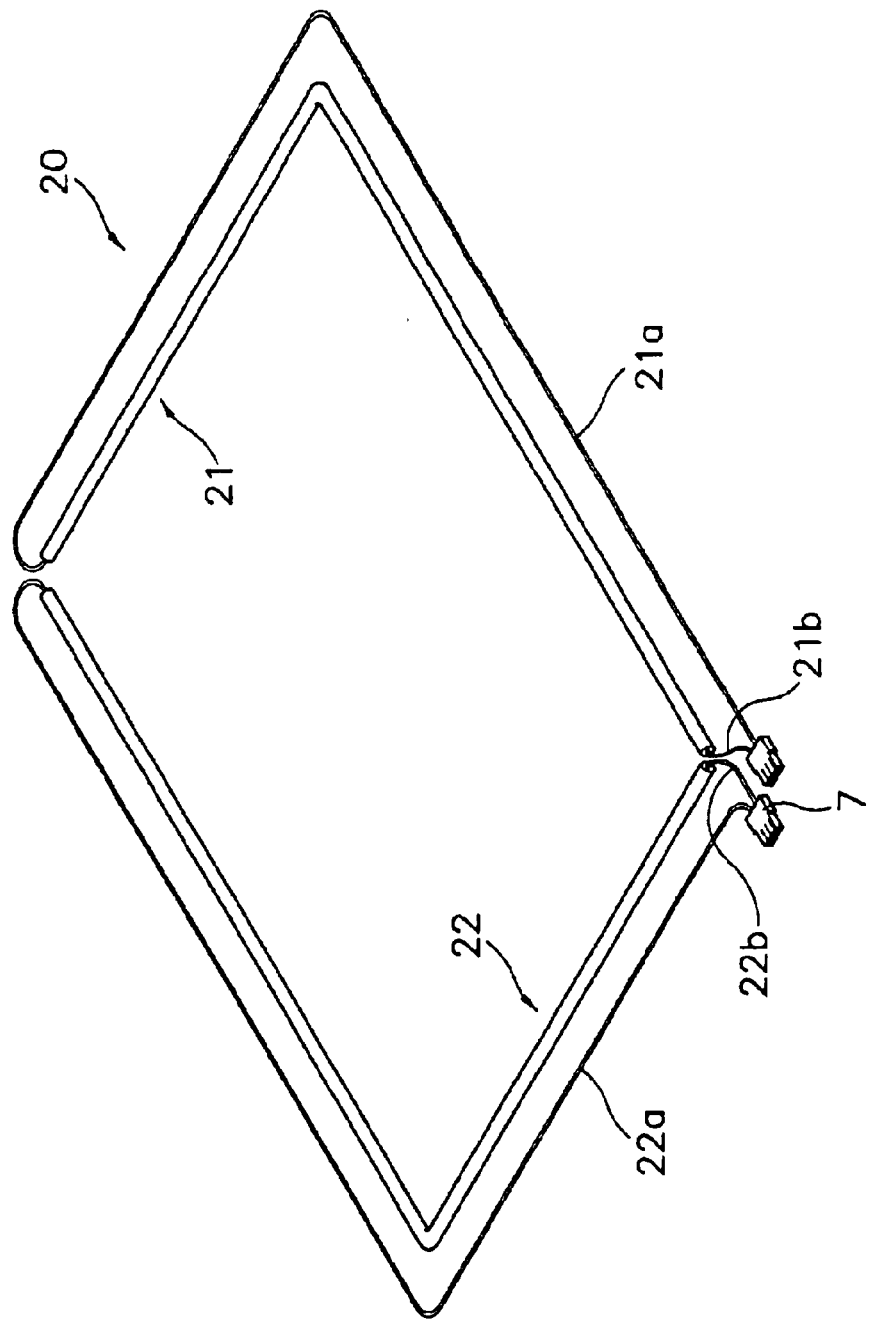
FIG. 2 is a perspective view showing another conventional CCFL.
Figure 3:
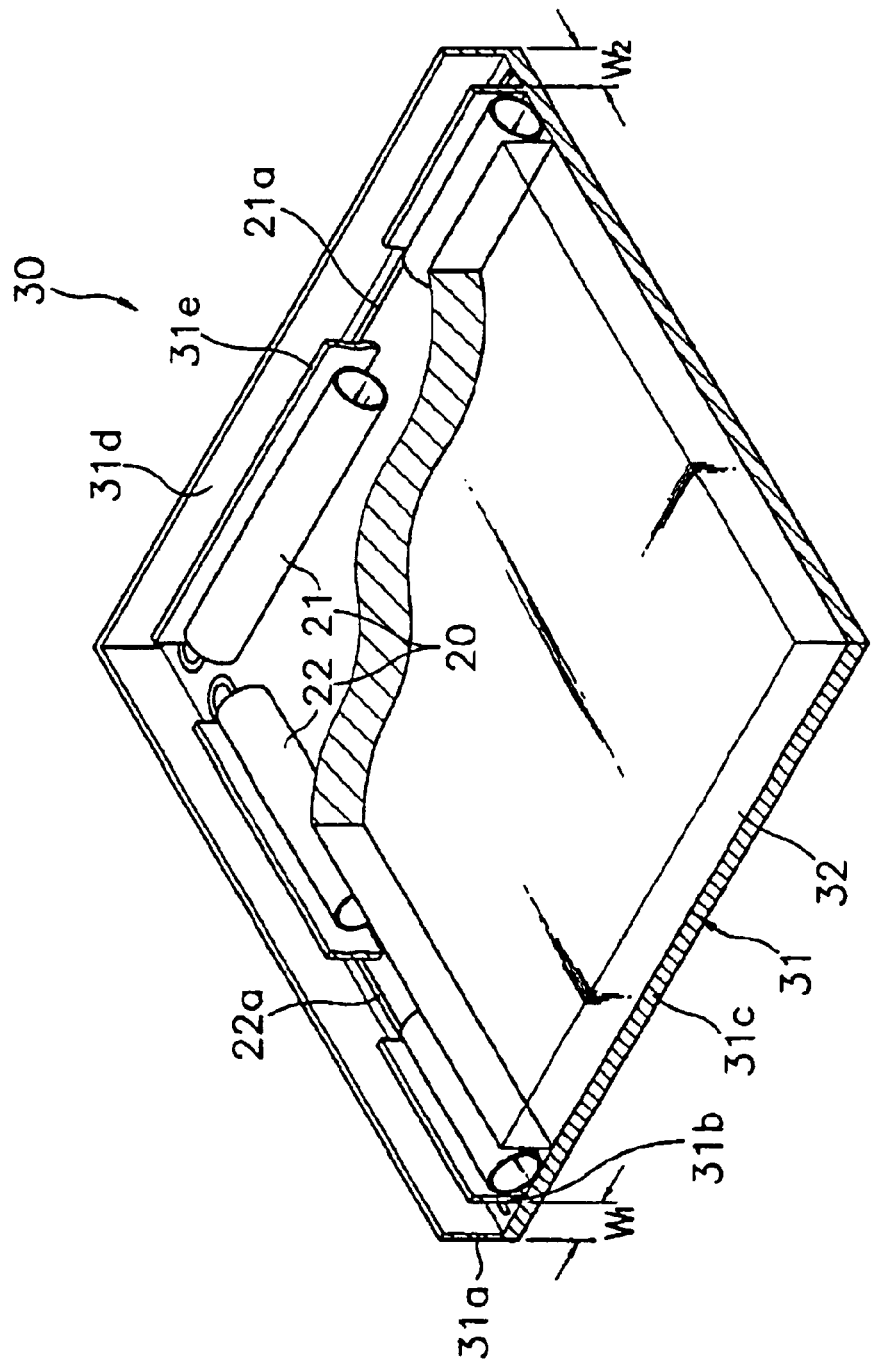
FIG. 3 is a partially cut perspective view showing an LCD apparatus having an L-shaped CCFL.
Figure 4:
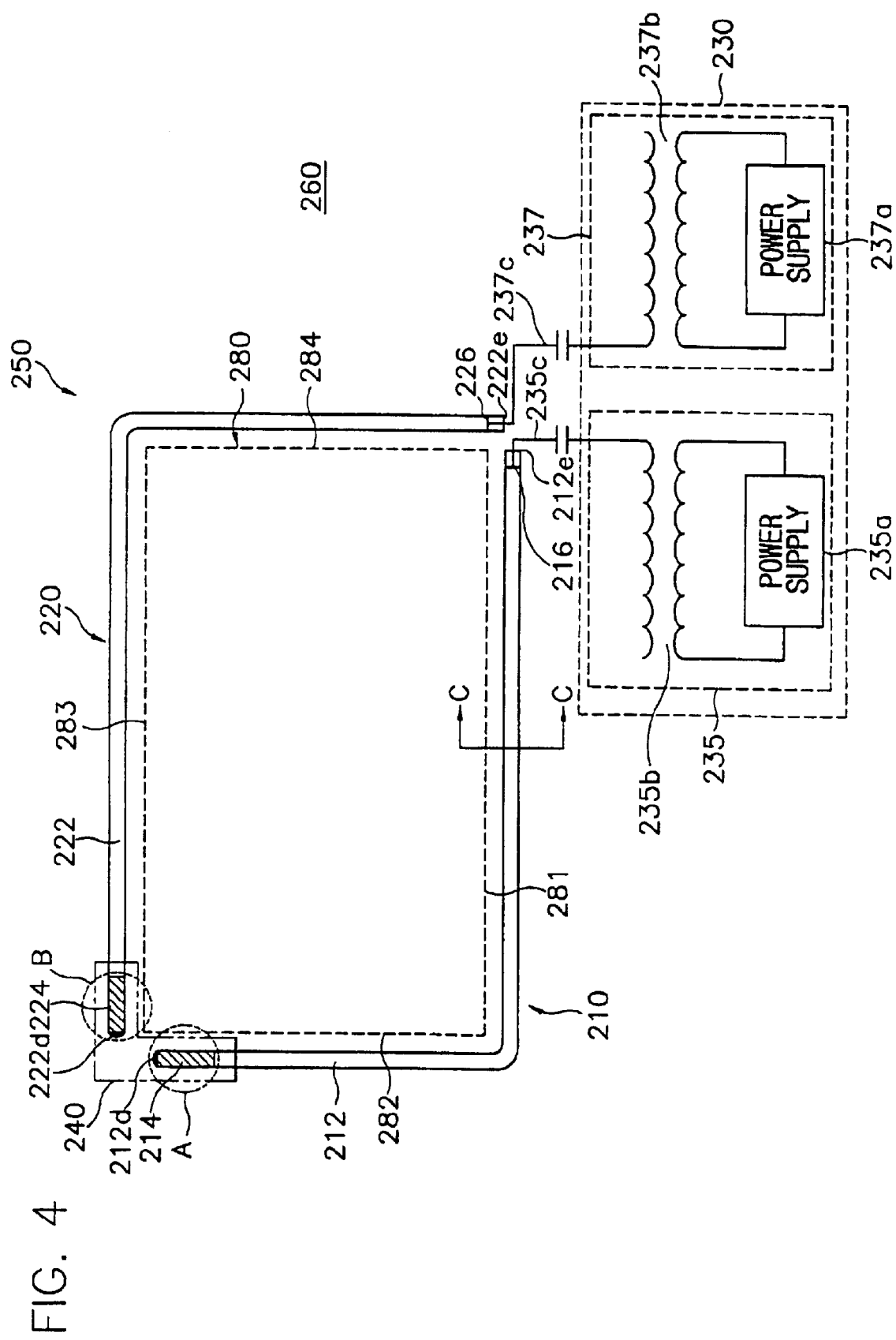
FIG. 4 is a schematic view showing a backlight assembly according to a first embodiment of the present invention.

FIG. 4 is a schematic view showing a backlight assembly according to a first embodiment of the present invention.

Referring to FIG. 4, a backlight assembly 250 includes a light guide plate 280, a first lamp 210, a second lamp 220, a discharge voltage supply part 230, a lamp connecting member 240 and a receiving container 260.

The light guide plate 280 has a plate shape, that is at least three side surfaces, a light reflecting surface and a light emitting surface. In the present invention, the light guide plate 280 has a first, a second, a third and a fourth side surface 281, 282, 283 and 284, respectively, The light guide plate 280 changes a direction and an optical property of a light. The direction and optical property of the light supplied to the light guide plate 280 through the first to fourth side surfaces 281, 282, 283 and 284 are changed during reflecting by the light reflecting surface and emitted through the light emitting surface.

The first and second lamps 210 and 220 supply the light to the first to fourth side surfaces 281, 282, 283 and 284 of the light guide plate 280. The first lamp 210 supplies the light to the first and second side surfaces 281 and 282, respectively, of the light guide plate 280 and the second lamp 220 supplies the light to the third and fourth side surfaces 283 and 284, respectively, Particularly, the first lamp 210 has an L shape bent to an angle identical to that between the first side surface 281 and the second side surface 282.

Also, the second lamp 220 has an L shape bent to an angle identical to that between the third side surface 283 and the fourth side surface 284.

The first and second lamps 210 and 220 have two end portions. The first lamp 210 has a first end portion 212d and a second end portion 212e and the second lamp 220 has a third end portion 222d and a fourth end portion 222e.

The first end portion 212d of the first lamp 210 and the third end portion 222d of the second lamp 220 are disposed adjacent to a corner formed by the second and third side surfaces 282 and 283, respectively. The second end portion 212e of the first lamp 210 and the fourth end portion 222e of the second lamp 220 are disposed adjacent to a corner formed by the first and fourth side surfaces 281 and 284, respectively.

Figure 5:
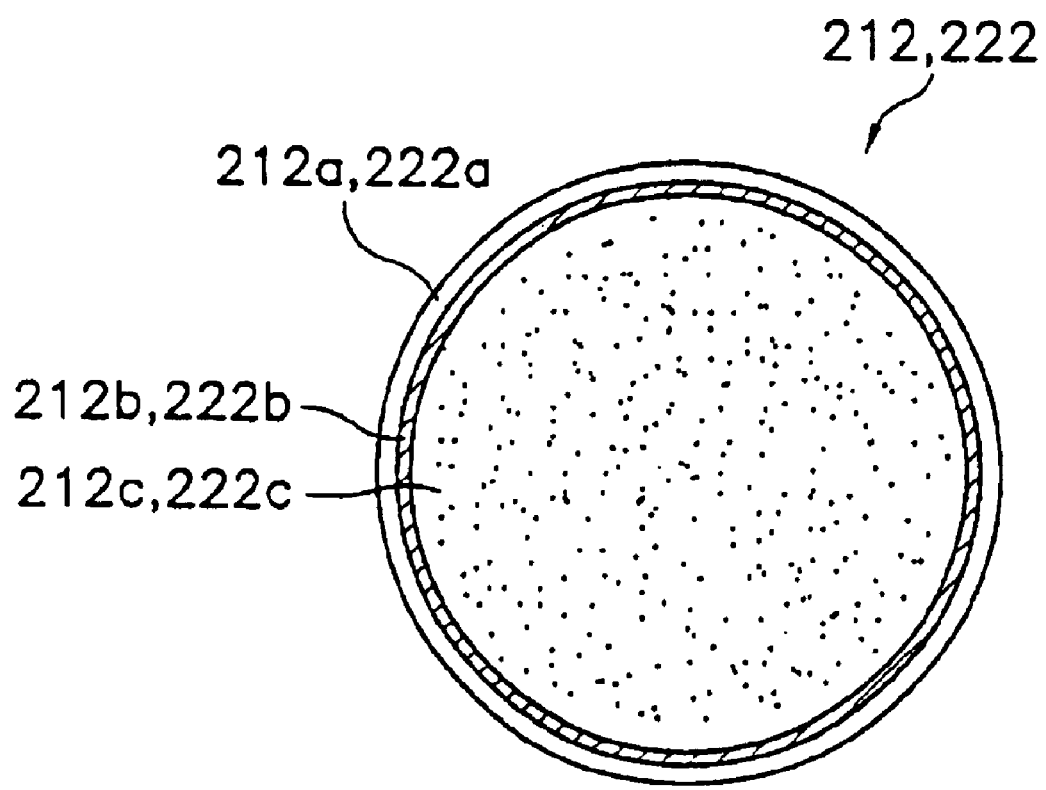
FIG. 5 is a cross-sectional view taken along the line C—C showing a structure of a lamp shown in FIG. 4.
Figure 7:
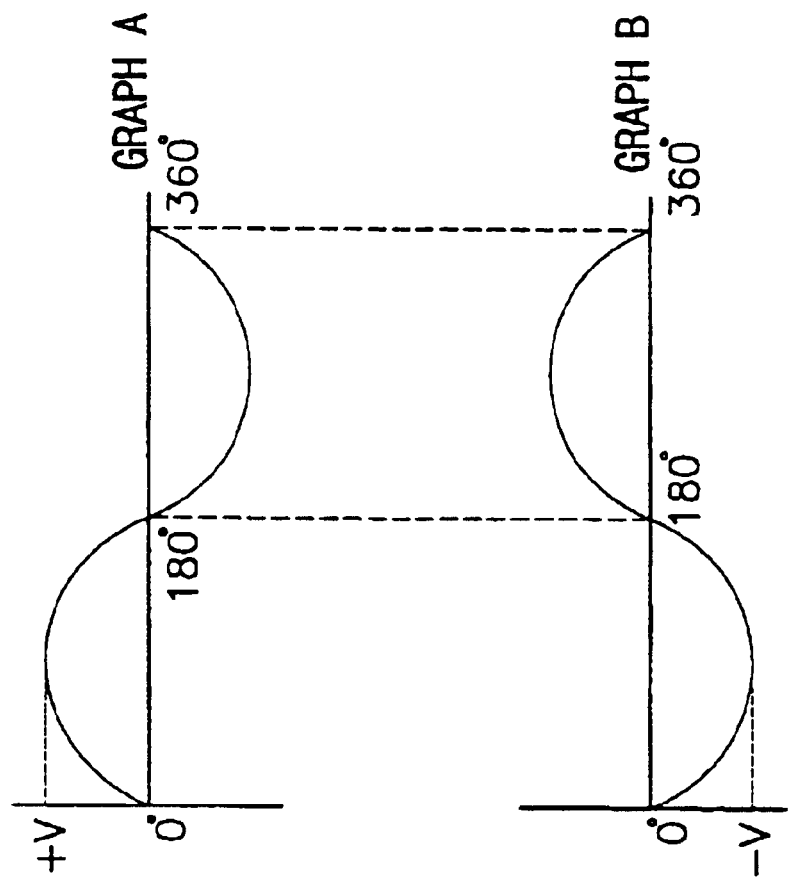
FIG. 7 is a graph illustrating a phase difference between first and second lamps according to the first embodiment of the present invention.

Hereinafter, the first and second lamps 210 and 220 are described with reference to FIGS. 5 and 7 in detail. FIG. 5 is a cross-sectional view taken along the line C—C showing a structure of a lamp shown in FIG. 4. FIG. 7 is a graph illustrating a phase difference between first and second lamps according to the first embodiment of the present invention.

The first lamp 210 includes a first lamp tube 212 having an L shape, a first electrode 214 and a second electrode 216. The first lamp tube 212 includes a first lamp tube body 212a, a fluorescent material 212b disposed on an inner wall of the first lamp tube body 212a and a discharge gas 212c. The first lamp tube 212 further includes a first electrode 214 and a second electrode 216 disposed at the first and second end portions 212d and 212e, respectively. The first and second electrodes 214 and 216 receive a discharge voltage.

The second lamp 220 includes a second lamp tube 222 having the L shape, a third electrode 224 and a fourth electrode 226. The second lamp tube 222 includes a second lamp tube body 222a, a fluorescent material 222b disposed on an inner wall of the second lamp tube body 222a and a discharge gas 222c. The second lamp tube 222 further includes a third electrode 224 and a fourth electrode 226 disposed at the third and fourth end portions 222d and 222e. The third and fourth electrodes 224 and 226 receive the discharge voltage.

In order to operate the first and second lamps 210 and 220, the backlight assembly 250 needs the discharge voltage supply part 230 and the lamp connecting member 240.

Referring to FIG. 4, the discharge voltage supply part 230 includes a first inverter 235 and a second inverter 237.

The first inverter 235 includes a first power voltage supply part 235a for supplying a first direct current, a first transforming part 235b for transforming the first direct current into a first alternating current having a first phase and a first voltage level, and a first output terminal 235c for outputting the first alternating current from the first transforming part 235b to the first lamp 210. The first output terminal 235c is connected to the second electrode 216 of the first lamp 210.

The second inverter 237 includes a second power voltage supply part 237a for supplying the first direct current, a second transforming part 237b for transforming the first direct current into a second alternating current having a second phase and a second voltage level, and a second output terminal 237c for outputting the second alternating current from the second transforming part 237b to the second lamp 220. The second output terminal 237c is connected to the fourth electrode 226 of the second lamp 220.

The first and second voltage levels of the first and second alternating currents are of a voltage level sufficient to ionize the discharge gases 212c and 222c. The first voltage level of the first alternating current from the first output terminal 235c is identical to the second voltage level of the second alternating current from the second output terminal 237c. The first phase of the first alternating current is different than the second phase of the second alternating current.

Referring to FIG. 7, a graph "A" shows the first phase of the first alternating current from the first output terminal 235c and a graph "B" shows the second phase of the second alternating current from the second output terminal 237c. According to the graphs "A" and "B", the first alternating current from the first output terminal 235c and the second alternating current from the second output terminal 237c have a phase difference of 180° from each other.

Figure 6:
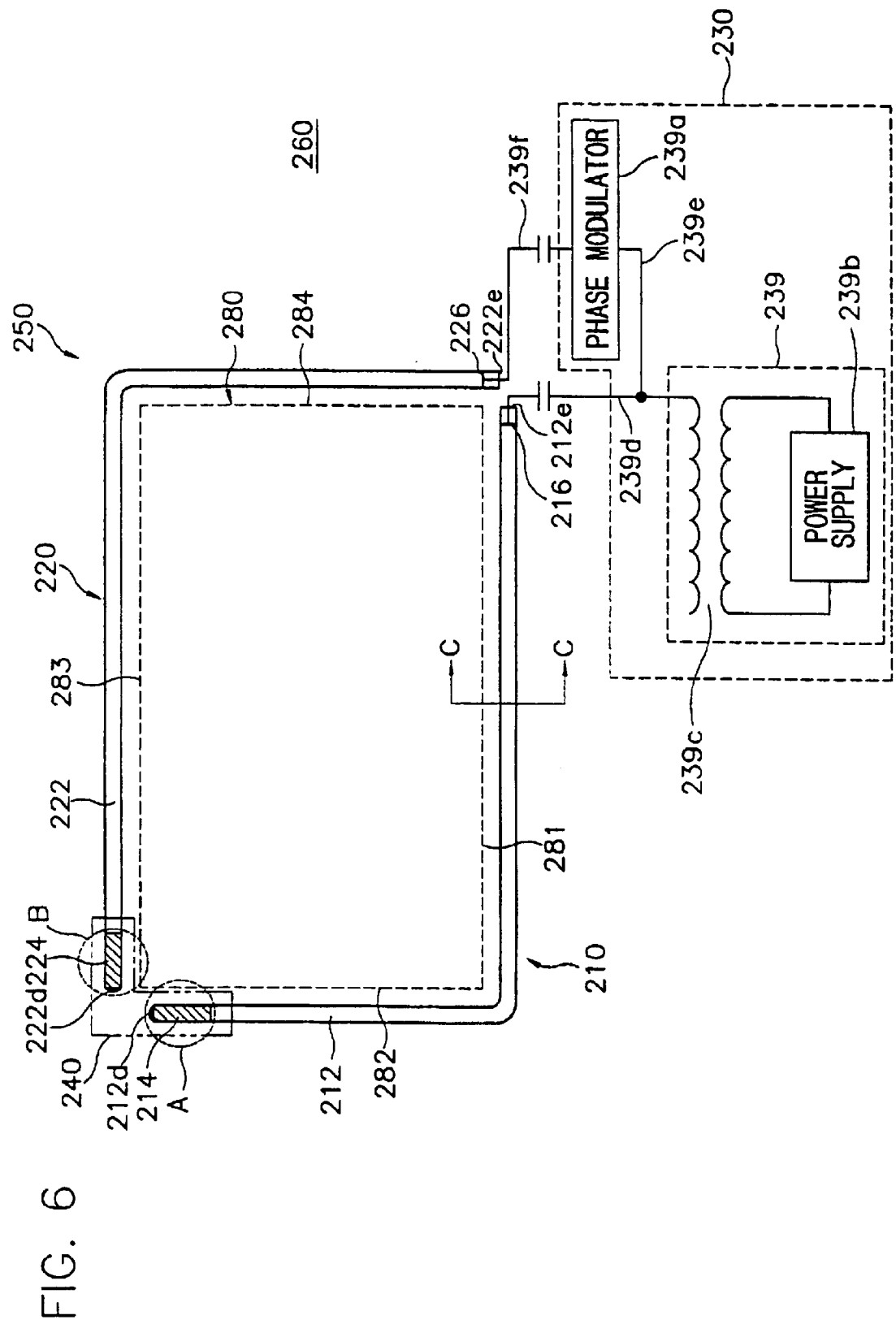
FIG. 6 is a schematic view showing a backlight assembly according to a second embodiment of the present invention.

FIG. 6 is a schematic view showing a backlight assembly according to a second embodiment of the present invention.

Referring to FIG. 6, a discharge voltage supply part 231 includes an inverter 239 and a phase modulator 239a.

The inverter 239 includes a direct current supply part 239b for supplying a direct current, a transforming part 239c, second and third output terminals 239d and 239e for outputting a first alternating current having a first phase in parallel, a phase modulator 239a and a fourth output terminal 239f for outputting a second alternating current from the phase modulator 239a.

The first direct current output from the direct current supply part 239b is converted into the first alternating current having the first phase by the transforming part 239c. The first alternating current from the transforming part 239c is supplied to the second and third output terminal 239d and 239e.

The second output terminal 239d is connected to the second electrode 216 of the first lamp 210 and the third output terminal 239d is connected to the phase modulator 239a. The phase modulator 239a receives the first alternating current and generates a second alternating current having a phase difference of 180° with respect to that of the first alternating current. The second alternating current output from the phase modulator 239a is supplied to the second lamp 220 through the fourth output terminal 239f and the fourth electrode 226 connected to each other.

In FIGS. 4 and 5, although the first and second alternating currents are applied to the second and fourth electrodes 216 and 226, the first and second lamps 210 and 220 are not turned on. This is because the first and second electrodes 214 and 216 of the first lamp 210 and the third and fourth electrodes 224 and 226 of the second lamp 216 are not in a closed loop.

If the first and third electrodes 214 and 224 are in a ground connection, the first and second lamps 210 and 220 will be turned on. However, a separate lamp wire is required for grounding the first and third electrodes 214 and 224.

In order to ground the first and third electrodes 214 and 224 without using the separate lamp wire, the backlight assembly 250 uses the lamp connecting member 240.

The lamp connecting member 240 offsets the first alternating current having the first phase provided through the first lamp 210 to the second alternating current having the phase difference of 180°, so that the first and third electrodes 214 and 224 drop in a zero voltage level, respectively. That is, the first and third electrodes 214 and 224 can have a ground voltage level—i.e. the zero voltage level—by means of the lamp connecting member 240 without using the separate lamp wire, so that the separate lamp wire can be removed from a lamp assembly.

The lamp connecting member 240 may use any conductive material so as to obtain the grounding. Also, the lamp connecting member 240 may further use a conductive wire that is welded between the first electrode 214 and the third electrode 224.

In the present invention, two embodiments of the lamp connecting member 240 are shown.

Figure 8:
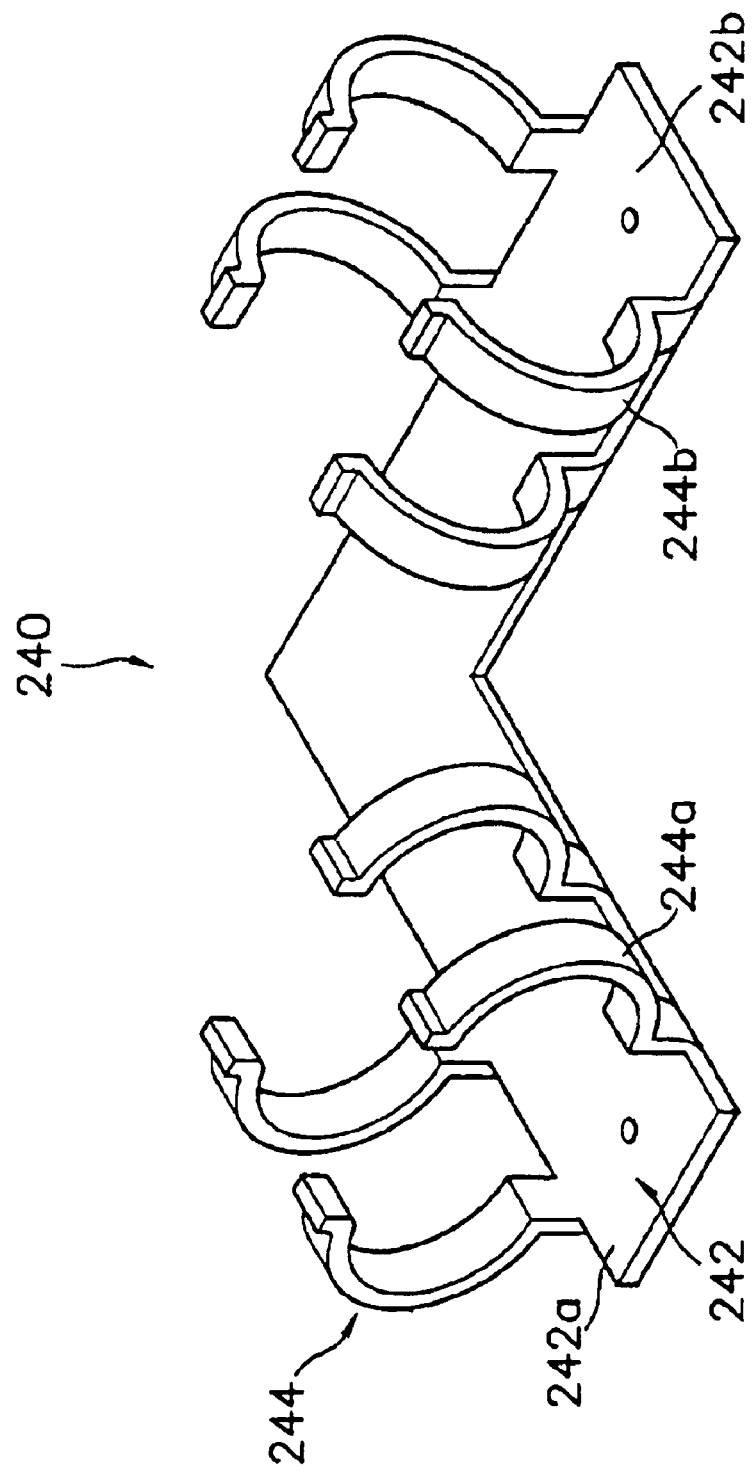
FIG. 8 is a perspective view showing a lamp connecting member according to the first embodiment of the present.

FIG. 8 is a perspective view showing a lamp connecting member according to the first embodiment of the present.

Referring to FIG. 8, a clip type lamp connecting member 240 grips the first and third electrodes 214 and 224 of the first and second lamps 210 and 220.

The clip type lamp connecting member 240 includes a conductive plate 242 having an L shape and a clip 244. The conductive plate 242 includes a first portion 242a and a second portion 242b. The clip 244 includes a first clip 244a disposed on the first portion 242a and a second clip 244b disposed on the second portion 242b.

Figure 9:
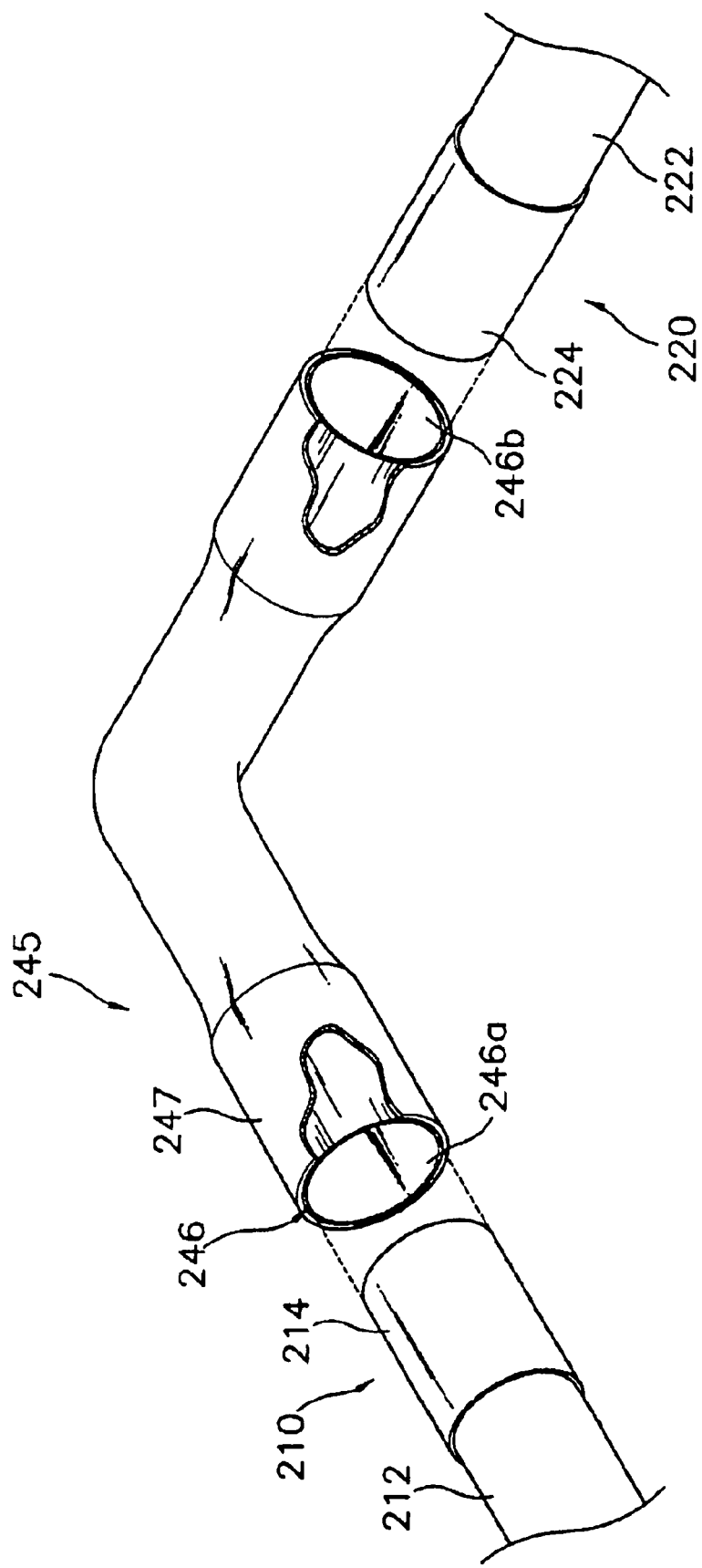
FIG. 9 is a perspective view showing a lamp connecting member according to the second embodiment of the present.
Figure 10:
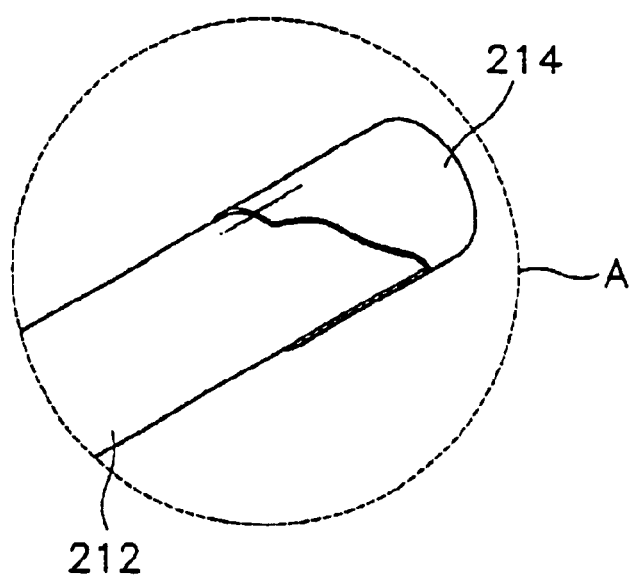
FIG. 10 is an enlarged view showing a first electrode of the first lamp according to the first embodiment of the present invention.
Figure 11:
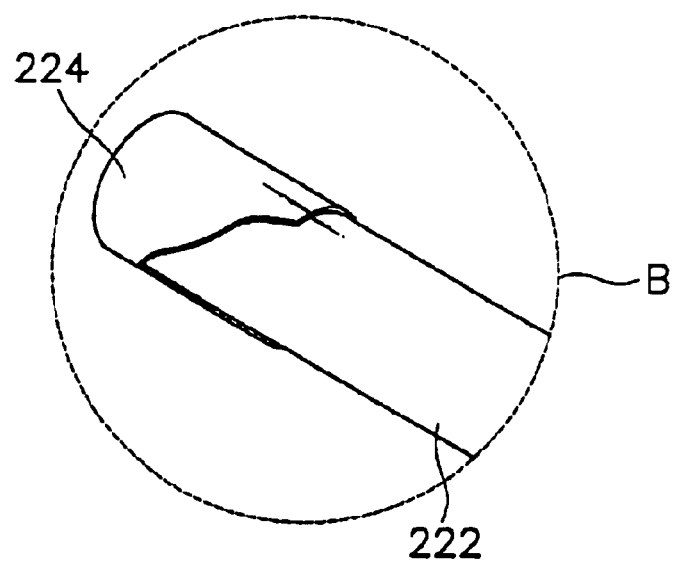
FIG. 11 is an enlarged view showing a third electrode of the second lamp according to the first embodiment of the present invention.

FIG. 9 is a perspective view showing a lamp connecting member according to the second embodiment of the present. FIG. 10 is an enlarged view showing the first electrode 214 of the first lamp tube 212. FIG. 11 is an enlarged view showing a third electrode 224 of the second lamp tube 222.

Referring to FIG. 9, a lamp connecting member 245 includes a conductive holder 246 and an insulating cover 247 for insulating an outer surface of the conductive holder 246. The conductive holder 246 has a pipe shape and includes a first end portion 246a and a second end portion 246b opposite the first end portion 246a.

As shown in FIGS. 10 and 11, the first electrode 214 of the first lamp 210 and the third electrode 224 of the second lamp 220 are disposed on the outer surfaces of the first and second lamp tubes 212 and 222, respectively, so as to assemble the first and second lamps 210 and 220 to the lamp connecting members 240 and 245.

Due to the first and third electrodes 214 and 224 being disposed on the outer surface of the first and second lamp tubes 212 and 222, respectively, the first and third electrodes 214 and 224 may be easily connected to the lamp connecting members 240 and 245. Also, it is possible to reduce brightness non-uniformity during driving the first and second lamps 210 and 220 using the discharge voltage supply part 230 having only one inverter 239 as shown in FIG. 6.

Figure 12:
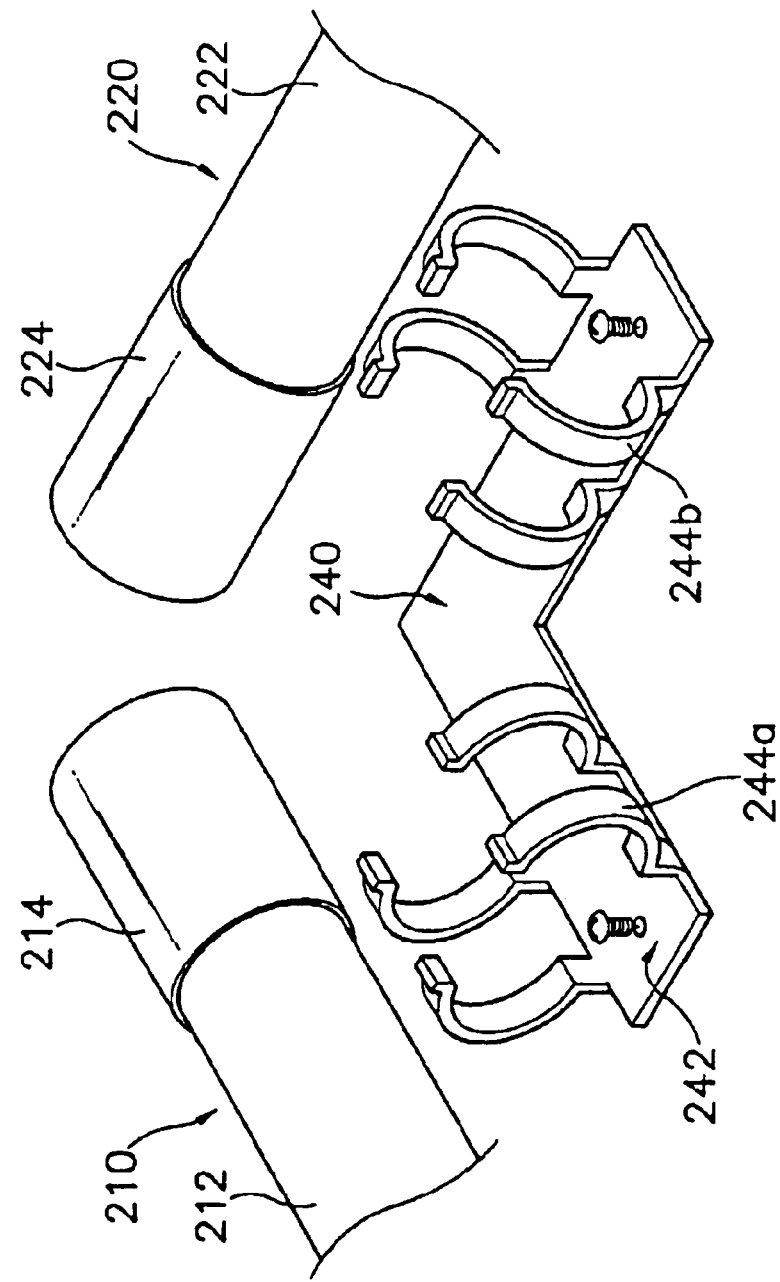
FIG. 12 is an exploded perspective view showing a structure of the lamp connecting member and the first and second lamps according to the first embodiment of the present invention.

FIG. 12 is an exploded perspective view showing a structure of the lamp connecting member, the first and second lamps according to the first embodiment of the present invention.

Referring to FIG. 12, the first electrode 214 of the first lamp 210 is inserted into the first clip 244a and the third electrode 224 of the second lamp 220 is inserted into the second clip 244b.

This insertion method of the first and third electrodes 214 and 224 with respect to the first and second clips 244a and 244b may be applied to the second and fourth electrodes 216 and 226 of the first and second lamps 210 and 220. In this case, the second and fourth electrodes 216 and 226 have to be disposed on the outer surfaces of the first and second lamp tubes 212 and 222. Also, the lamp connecting member 240 is connected to the first and second output terminals 235c and 237c of the discharge voltage supply part 230.

Figure 13:
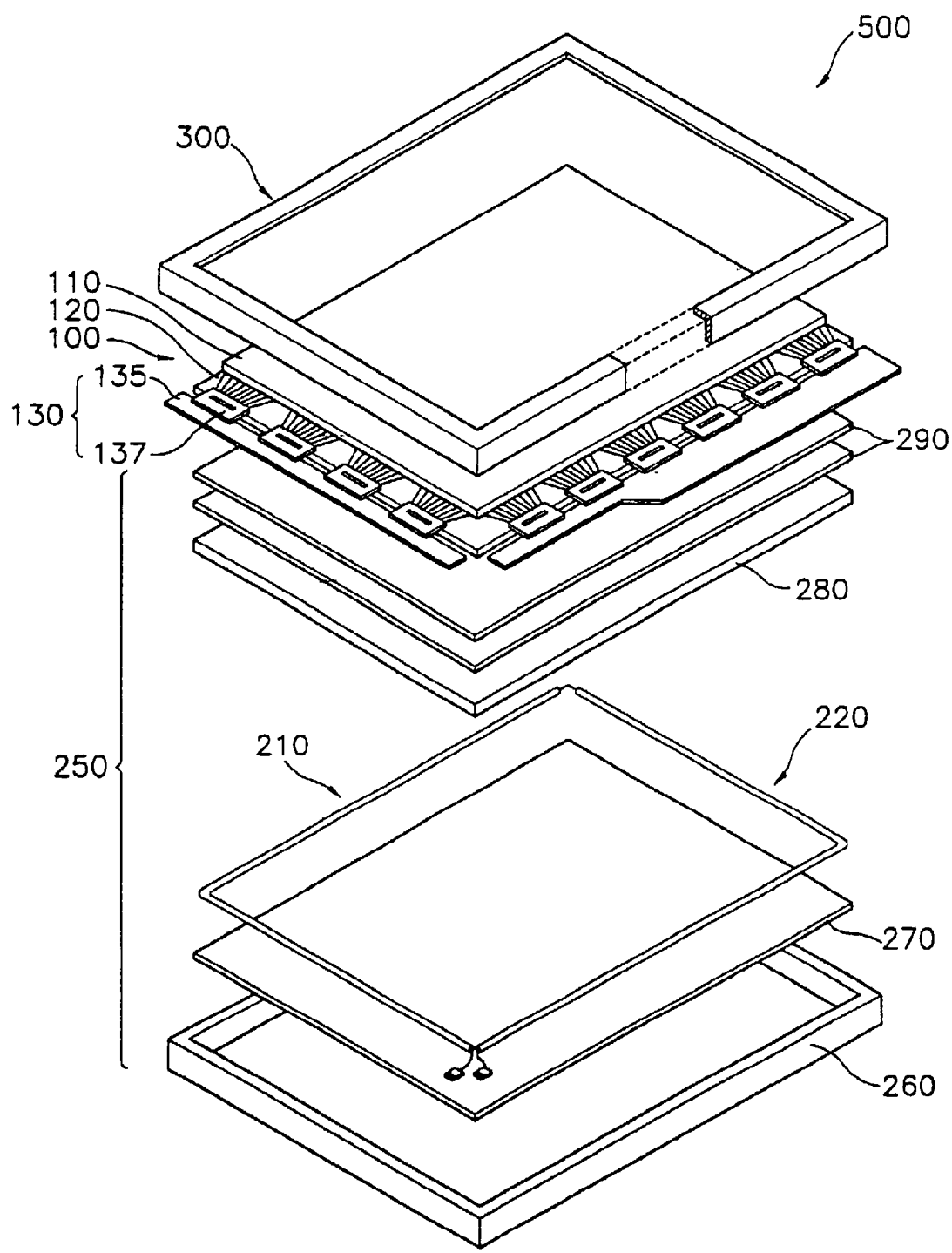
FIG. 13 is an exploded perspective view showing an LCD apparatus according to the present invention.

FIG. 13 is an exploded perspective view showing an LCD apparatus according to the present invention.

Referring to FIG. 13, an LCD apparatus 500 includes an LCD panel assembly 100, the backlight assembly 250 and a chassis 300 for fixing the LCD panel assembly 100 and the backlight assembly 250.

The backlight assembly 250 supplies the light to the LCD panel assembly 100. The backlight assembly 250 includes the first lamp 210, the second lamp 220, the discharge voltage supply part 230, the lamp connecting member 240 (see FIG. 4 and FIG. 6), the receiving container 260 (see FIG. 4 and FIG. 6), the light guide plate 280, the optical sheet 290 and a reflecting plate 270.

Hereinafter, an assembling method of the LCD apparatus will be described with reference to FIGS. 13 to 15.

FIG. 14 is a partially cut perspective view showing the backlight assembly, the lamp connecting member and a chassis according to the present invention. FIG. 15 is a cross-sectional view taken along the line D—D showing a structure of the LCD apparatus shown in FIG. 13.

As shown in FIG. 13, the reflecting plate 270, the first and second lamps 210 and 220 and the light guide plate 280 are sequentially received in the receiving container 260. The first and second lamps 210 and 220 are disposed between the receiving container 260 and the first to fourth side surfaces 281, 282, 283 and 284 (see FIG. 4 and FIG. 6) of the light guide plate 280.

The optical sheet 290 is disposed on the light guide plate 280. The optical sheet 290 includes a diffusion sheet for uniformly increasing the brightness of light emitted from the light guide plate 280 and a prism sheet for changing a direction of the light emitted from the diffusion sheet.

The backlight assembly 250 is assembled to the LCD panel assembly 100. The LCD panel assembly 100 receives the light from the backlight assembly 250 and emits a light having image information by controlling the light.

The LCD panel assembly 100 includes a TFT (Thin Film Transistor) substrate 120, a color filter substrate 110 and a liquid crystal interposed between the TFT substrate 120 and the color filter substrate 110.

The TFT substrate 120 includes a plurality of transparent pixel electrodes formed on a glass substrate. The number of the transparent pixel electrodes depends on a resolution of the LCD panel assembly 100. The transparent pixel electrodes receive a power voltage from a TFT of a few micro-millimeters.

The color filter substrate 110 faces the TFT substrate 120 and includes a common electrode for receiving a reference voltage and a color filter for filtering a wavelength of the light passed through the liquid crystal.

The liquid crystal interposed between the TFT substrate 120 and the color filter substrate 110 changes a transmittance of the light in response to an electric field difference generated between the common electrode of the color filter substrate 110 and the pixel electrode of the TFT substrate 120.

The LCD panel assembly 100 further includes a driving module 130 for supplying driving signals to the thin film transistor disposed on the TFT substrate 120. The driving module 130 includes a printed circuit board 135 and a tape carrier package 137 for connecting between the printed circuit board 135 and the TFT substrate 120.

The chassis 300 is coupled to the receiving container 260 after receiving the LCD panel assembly 100 and the backlight assembly 250 in the receiving container 260. The LCD panel assembly 100 and the backlight assembly 250 are fixed to the receiving container 260 by coupling the chassis 300 to the receiving container 260.

In FIG. 14, a reference numeral "244c" indicates an impact absorbing member for preventing the first and second lamps 210 and 220 from being damaged by an impact applied to the receiving container 260.

The chassis 300 has a rectilinear shape with a bottom surface opened to expose an effective display area of the LCD panel assembly 100 and a cramp shape at an edge portion. The edge portion of the chassis 300 is coupled to an outer surface of the receiving container 260 to fix the LCD panel assembly 100 to the receiving container 260 and protect an edge portion of the LCD panel assembly 100. The chassis 300 is made of a stainless steel appropriate to ground the LCD apparatus 500.

In FIG. 14, the LCD panel assembly 100, the optical sheet 290 and the light guide plate 280 are not shown in order to show a ground structure between the lamp assembly 250 and the chassis 300.

Referring to FIGS. 14 and 15, the lamp connecting member 240 of the backlight assembly 250 is grounded to the chassis 300. For this purpose, the lamp connecting member 240 includes a grounding portion 249 extending to an outer surface of the receiving container 260. The grounding portion 249 grounds the lamp assembly 250 to the chassis 300.

The grounding portion 249, which extends from the lamp connecting member 240 comes in contact with the chassis 300, so that the first and third electrodes 214 and 224 are grounded to the chassis 300.

According to the LCD apparatus, it is able to remove a lamp wire for supplying a power voltage to the lamp, so that an entire size of the LCD apparatus can be reduced and the lamp can be easily replaced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
    a light guide plate having a plurality of side surfaces, the light guide plate changing a direction and an optical property of first and second lights;
    a first lamp that provides the light guide plate with the first light, the first lamp having a first lamp tube disposed adjacent to the plurality of side surfaces, a first electrode disposed at a first end portion of the first lamp tube and a second electrode disposed at a second end portion opposite the first end portion of the first lamp tube;
    a second lamp that provides the light guide plate with the second light, the second lamp having a second lamp tube disposed adjacent to the plurality of side surfaces, a third electrode disposed at a third end portion of the second lamp tube and a fourth electrode disposed at a fourth end portion, the third end portion being disposed adjacent to the first end portion and the fourth end portion being disposed adjacent to the second end portion;
    a connector that electrically connects the first electrode to the third electrode; and
    a power supply that supplies a first discharge voltage to the second electrode of the first lamp and a second discharge voltage to the fourth electrode of the second lamp, the first and second discharge voltages having a phase difference of 180° and a substantially same voltage level,
    wherein each of the first and second lamps is bent so as to be contiguous to at least two side surfaces of the light guide plate.

2. The backlight assembly of claim 1, wherein the plurality of side surfaces comprises four side surfaces, the first lamp tube has an L shape and is disposed adjacent to a first side surface and a second side surface adjacent to the first side surface, and the second lamp tube has the L shape and is disposed adjacent to a third side surface and a fourth side surface adjacent to the third surface.

3. The backlight assembly of claim 1, wherein the power supply comprises:
    a first inverter for supplying the first discharge voltage having a first phase to the second electrode of the first lamp; and
    a second inverter for supplying the second discharge voltage having a second phase to the fourth electrode, the second phase having the phase difference of 180° with respect to the first phase.

4. The backlight assembly of claim 1, wherein the power supply comprises:
    an inverter for generating the first discharge voltage supplied to the second electrode; and
    a phase modulator for modulating a phase of the first discharge voltage by 180°;
    wherein the second discharge voltage supplied to the fourth electrode is the modulated first discharge voltage.

5. The backlight assembly of claim 1, wherein the first and third electrodes are external electrodes.

6. The backlight assembly of claim 1, wherein the second and fourth electrodes are external electrodes.

7. The backlight assembly of claim 1, wherein the connector further comprises a lamp connecting member.

8. The backlight assembly of claim 7, wherein the lamp connecting member comprises:
    a conductive plate; and
    a conductive clip extended from the conductive plate, for outwardly gripping the first and third electrodes.

9. The backlight assembly of claim 7, wherein the lamp connecting member is a conductive holder having a first end portion into which the first electrode is inserted and a second end portion into which the third electrode is inserted, the second end portion being opposite the first end portion.

10. The backlight assembly of claim 9, wherein the conductive holder further comprises an insulating cover disposed on an outer surface.

11. A backlight assembly comprising:
    a light guide plate having first, second, third, and fourth side surfaces, the light guide plate changing a direction and an optical property of first and second lights;
    a first lamp that provides the light guide plate with the first light, the first lamp having a first lamp tube disposed adjacent to the first and second side surfaces, a first electrode disposed on a surface of a first end portion of the first lamp tube and a second electrode disposed at an interior of a second end portion of the first lamp tube, the second end portion being opposite the first end portion of the first lamp tube, the first lamp tube having an L shape;

a second lamp that provides the light guide plate with the second light, the second lamp having a second lamp tube disposed adjacent to the third and fourth side surfaces, a third electrode disposed on a surface of a third end portion of the second lamp tube and a fourth electrode disposed at an interior of a fourth end portion of the second lamp tube, the third end portion being disposed adjacent to the first end portion of the second lamp tube, portion being disposed adjacent to the second end portion, and the second lamp tube having the L shape;

a conductive lamp connecting member that electrically connects the first electrode to the third electrode; and a power supply that supplies a first discharge voltage to the second electrode of the first lamp and a second discharge voltage to the fourth electrode of the second lamp, the first and second discharge voltages having a phase difference of 180° and a substantially same voltage level.

12. The backlight assembly of claim 11, wherein the power supply comprises:

a first inverter for supplying the first discharge voltage to the second electrode of the first lamp; and a second inverter for supplying the second discharge voltage to the fourth electrode of the second lamp.

13. The backlight assembly of claim 11, wherein the power supply comprises:

an inverter for generating the first discharge voltage supplied to the second electrode; and a phase modulator for modulating a phase of the first discharge voltage by 180°;

wherein the second discharge voltage supplied to the fourth electrode is the modulated first discharge voltage.

14. A liquid crystal display (LCD) apparatus comprising:

a backlight assembly including:

a light guide plate having a plurality of side surfaces, the light guide plate changing a direction and an optical property of first and second lights;

a first lamp that provides the light guide plate with the first light, the first lamp having a first lamp tube disposed adjacent to the plurality of side surfaces, a first electrode disposed at a first end portion of the first lamp tube and a second electrode disposed at a second end portion opposite the first end portion of the first lamp tube;

a second lamp that provides the light guide plate with the second light, the second lamp having a second lamp tube disposed adjacent to the plurality of side surfaces, a third electrode disposed at a third end portion of the second lamp tube and a fourth electrode disposed at a fourth end portion, the third end portion being disposed adjacent to the first end portion and the fourth end portion being disposed adjacent to the second end portion;

a connector that electrically connects the first electrode to the third electrode; and a power supply that supplies a first discharge voltage to the second electrode of the first lamp and a second discharge voltage to the fourth electrode of the second lamp, the first and second discharge voltages having a phase difference of 180° and a substantially same voltage level, wherein each of the first and second lamps is bent so as to be contiguous to at least two side surfaces of the light guide plate; and an LCD panel assembly for receiving the light from the backlight assembly and generating a display light having image information.

15. The LCD apparatus of claim 14, further comprising a chassis having an opening corresponding to an effective display area of the LCD panel assembly and electrically connected to the connector.

16. The LCD apparatus of claim 15, wherein the connector comprises:

a conductive plate having an L shape;

a plurality of clips extended from the conductive plate, for outwardly gripping the first and third electrodes.

17. The LCD apparatus of claim 16, further comprising an impact absorbing member disposed between the conductive plate and a receiving container.

18. The LCD apparatus of claim 14, wherein the connector comprises:

a conductive holder having a first end portion into which the first electrode is inserted and a second end portion, opposite the first end portion, into which the third electrode is inserted; and an insulating cover disposed on an outer surface of the conductive holder.

19. The LCD apparatus of claim 14, wherein the first electrode is disposed on an outer surface of the first lamp tube and the third electrode is disposed on an outer surface of the second lamp tube.

20. The LCD apparatus of claim 14, wherein the second electrode is disposed on an outer surface of the first lamp tube and the fourth electrode is disposed on an outer surface of the second lamp tube.

21. The LCD apparatus of claim 16, wherein the connector further includes a grounding member that grounds the conductive plate to the chassis, the grounding member being extended from a selected portion of the connector toward the chassis.

* * * * *